(12) United States Patent
Chang

(10) Patent No.: US 9,071,715 B2
(45) Date of Patent: *Jun. 30, 2015

(54) METHOD FOR DETECTING WHETHER PAPER IS REMAINED BY USING MEANS OF TIME-DETECTING AND IMAGE-SIMILARITY COMPARING AND MULTI-FUNCTION PRINTER THEREOF

(75) Inventor: Hung-Chieh Chang, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 954 days.

This patent is subject to a terminal disclaimer.

(21) Appl. No.: 13/006,431

(22) Filed: Jan. 14, 2011

(65) Prior Publication Data

US 2012/0113450 A1 May 10, 2012

(30) Foreign Application Priority Data

Nov. 10, 2010 (TW) ................................ 99138683 A

(51) Int. Cl.
*G06F 3/12* (2006.01)
*H04N 1/00* (2006.01)

(52) U.S. Cl.
CPC ....... *H04N 1/00771* (2013.01); *H04N 1/00689* (2013.01); *H04N 1/00737* (2013.01); *H04N 1/00748* (2013.01); *H04N 1/00824* (2013.01); *H04N 2201/0098* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,079,722 | A * | 1/1992 | Ogawa | 358/1.12 |
| 5,453,818 | A * | 9/1995 | Maehara et al. | 399/14 |
| 2003/0218642 | A1* | 11/2003 | Sakayori et al. | 345/853 |
| 2005/0132028 | A1* | 6/2005 | Lester et al. | 709/222 |
| 2006/0171726 | A1* | 8/2006 | Noda et al. | 399/16 |
| 2007/0036558 | A1* | 2/2007 | Huss et al. | 399/8 |
| 2008/0104412 | A1* | 5/2008 | Shishido | 713/185 |
| 2008/0199199 | A1* | 8/2008 | Kato et al. | 399/81 |
| 2008/0297839 | A1* | 12/2008 | Kayama et al. | 358/1.15 |
| 2009/0067012 | A1* | 3/2009 | Iwayama | 358/475 |
| 2009/0251716 | A1* | 10/2009 | Igarashi | 358/1.12 |
| 2009/0279116 | A1* | 11/2009 | Nishio | 358/1.13 |
| 2011/0032566 | A1* | 2/2011 | Sato | 358/1.15 |

FOREIGN PATENT DOCUMENTS

| | | |
|---|---|---|
| TW | 451156 | 8/2001 |
| TW | 593103 | 6/2004 |
| TW | I223629 | 11/2004 |
| TW | I288081 | 10/2007 |
| TW | 200832238 | 8/2008 |
| TW | 201039133 | 11/2010 |
| TW | 201039227 | 11/2010 |

OTHER PUBLICATIONS

"Office Action of Taiwan Counterpart Application", issued on Dec. 24, 2012, p. 1-p. 9, in which the listed references were cited.

* cited by examiner

Primary Examiner — Nicholas Pachol
(74) Attorney, Agent, or Firm — Jianq Chyun IP Office

(57) ABSTRACT

A method for detecting whether a paper is remained and a multi-function printer (MFP) thereof are provided. The method includes executing a detection procedure when the MFP accomplishes image capturing and outputting of the paper; recording a time of starting executing the detection procedure; calculating an executed time of the detection procedure; and determining whether to activate an alarm according to the executed time of the detection procedure and a similarity comparison result obtained by executing a scan procedure, so as to remind a user whether the paper is remained in the MFP.

12 Claims, 4 Drawing Sheets

METHOD FOR DETECTING WHETHER PAPER IS REMAINED BY USING MEANS OF TIME-DETECTING AND IMAGE-SIMILARITY COMPARING AND MULTI-FUNCTION PRINTER THEREOF

CROSS-REFERENCE TO RELATED APPLICATION

This application claims the priority benefit of Taiwan application serial no. 99138683, filed on Nov. 10, 2010. The entirety of the above-mentioned patent application is hereby incorporated by reference herein and made a part of this specification.

BACKGROUND OF THE INVENTION

1. Field of the Invention

The invention relates to a method for detecting whether a paper is remained and a multi-function printer (MFP) thereof.

2. Description of Related Art

With the coming of the information society, office automation equipment, for example, a scanner, a photocopier, or a printer, is set in offices, and a user can perform the word processing operation by using the office automation equipment. It should be noted that when being configured in the office at the same time, the office automation equipment may occupy much space. Therefore, an MFP integrating functions of photocopying, printing, and scanning is developed. However, when many users scan or photocopy the paper by using the MFP, a problem that the paper is remained in the MFP occurs.

SUMMARY OF THE INVENTION

Accordingly, the present invention is directed to a method for detecting whether a paper is remained and an MFP thereof, capable of effectively solving a problem that the paper is remained in the MFP.

The present invention provides a method for detecting whether a paper is remained, applicable to an MFP, in which the method includes: executing a detection procedure, when the MFP accomplishes image capturing and outputting of the paper; recording a time of starting executing the detection procedure; calculating an executed time of the detection procedure; and determining whether to activate an alarm according to the executed time of the detection procedure and a similarity comparison result obtained by executing a scan procedure, so as to remind a user whether the paper is remained in the MFP.

The present invention further provides an MFP including a scan module and a control module. The scan module is used to scan a paper. The control module is coupled to the scan module, for controlling operation of the scan module, and detecting whether the paper is remained in the MFP according to an executed time of a detection procedure and a similarity comparison result obtained by executing a scan procedure, when the MFP accomplishes image capturing and outputting of the paper, so as to determine whether to activate an alarm to remind a user.

According to an embodiment of the invention, the activated alarm may include one or a combination of an indicating text, a sound, and a lamplight.

As described above, when accomplishing the image capturing and the outputting of the paper, the MFP starts to detect whether the paper is remained in the MFP. Once detecting that the paper is remained in the MFP for a time exceeding a preset time, the MFP activates the alarm, for example, one or a combination of the indicating text, the sound, and the lamplight, so as to remind the user. In this manner, the problem that the paper is remained in the MFP is effectively solved.

It should be noted that the above description and the following embodiments are for the exemplary and demonstrative purpose only, but are not intended to limit the scope of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
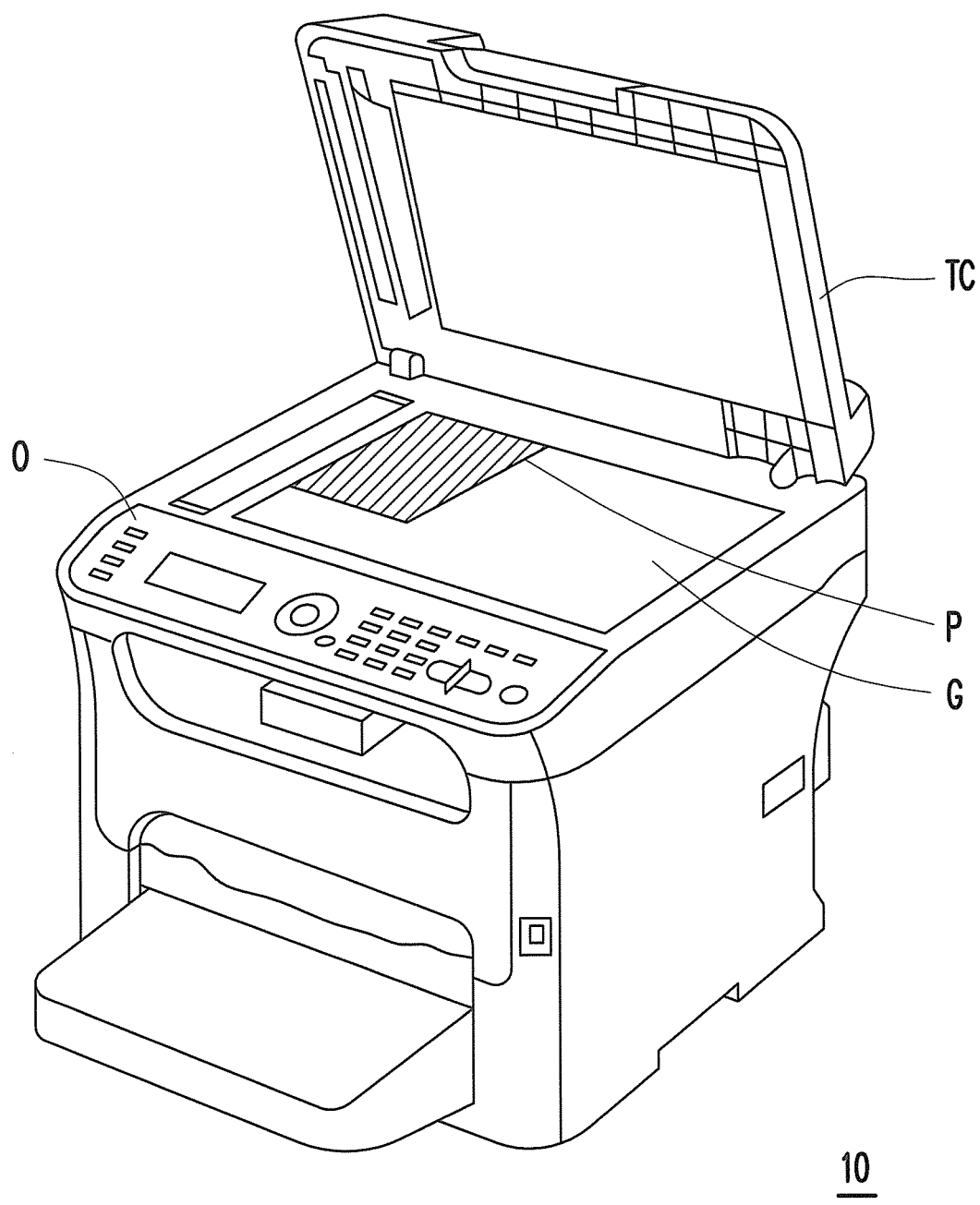
FIG. 1A is a diagram illustrating the appearance of a multi-function printer (MFP) 10 according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
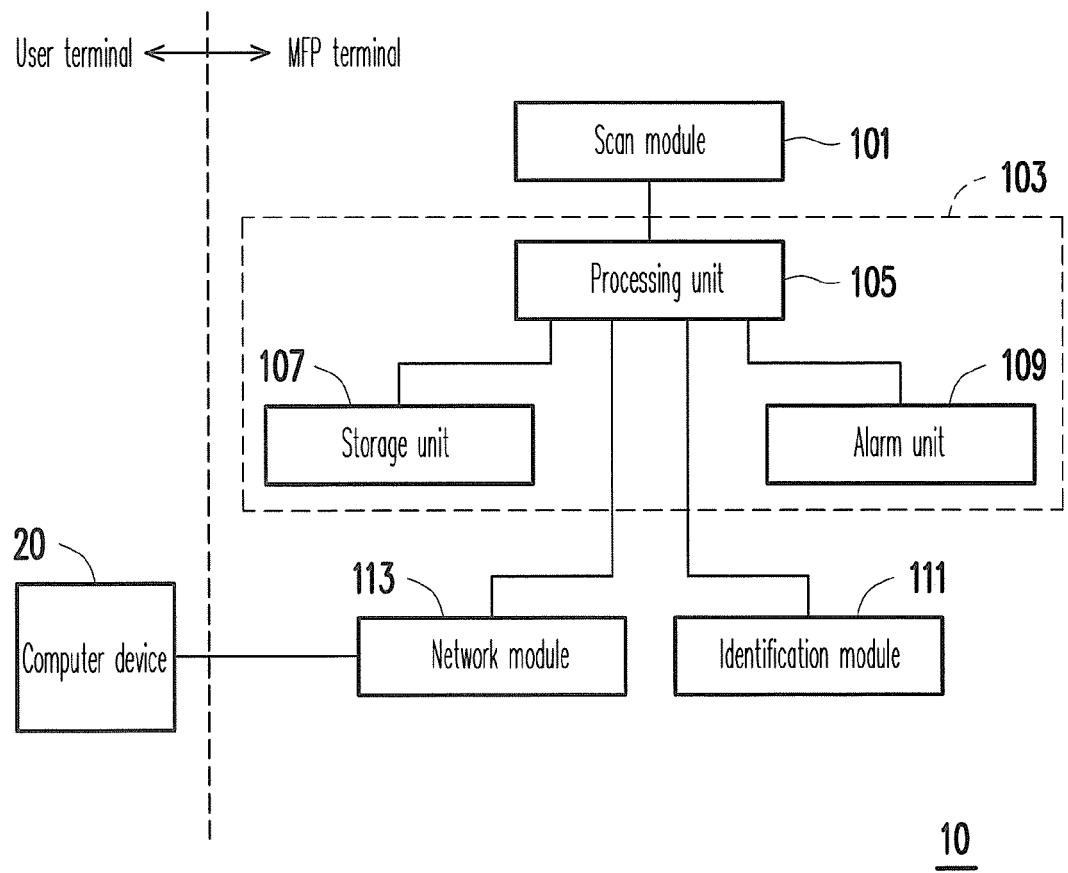
FIG. 1B is a system diagram of the MFP 10 according to an embodiment of the invention.

FIG. 1A is a diagram illustrating the appearance of a multi-function printer (MFP) 10 according to an embodiment of the invention, and FIG. 1B is a system diagram of the MFP 10 according to an embodiment of the invention. Referring to both FIG. 1A and FIG. 1B, in the present embodiment, the MFP 10 at least includes a scan module 101 and a control module 103. The scan module 101 is used to scan a paper P. The control module 103 is coupled to the scan module 101, for controlling the operation of the scan module 101, and when the MFP 10 accomplishes image capturing and outputting of the paper P, the control module 103 detects whether the paper P is remained in the MFP 10 according to an executed time of a detection procedure and a similarity comparison result obtained by executing a scan procedure (will be described in detail below), so as to determine whether to activate an alarm (for example, one or a combination of an indicating text, a sound, and a lamplight) to remind a user.

To be specific, the control module 103 includes a processing unit 105, a storage unit 107, and an alarm unit 109. The processing unit 105 is coupled to the scan module 101, for controlling the operation of the scan module 101, and when the MFP 10 accomplishes image capturing and outputting of the paper P, the processing unit 105 executes aforementioned detection procedure and scan procedure. The storage unit 107 is coupled to the processing unit 105 and configured to temporarily store an image of the paper P previously captured by the MFP 10. The alarm unit 109 is coupled to the processing unit 105 and controlled by the processing unit 105 to determine whether to activate the alarm (for example, one or a combination of an indicating text, a sound, and a lamplight).

In the present embodiment, when the user wants to scan or photocopy the paper P by using the MFP 10, the paper P should be located on a proper location of a transparent glass platform G of the MFP 10, then a top cover (TC) of the MFP 10 is closed, and finally, the processing unit 105 controls the scan module 101 to scan or photocopy the paper P after performing function setting and activating on an operational panel O.

When the MFP 10 accomplishes the image capturing and the outputting of the paper P, the processing unit 105 starts to execute the detection procedure. When the processing unit 105 executes the detection procedure, the processing unit 105 records a time of starting executing the detection procedure, calculates the executed time of the detection procedure, and determines whether to control the alarm unit 109 to activates the alarm (for example, one or a combination of an indicating text, a sound, and a lamplight) according to the executed time of the detection procedure and the similarity comparison result obtained by executing the scan procedure.

Figure 2:
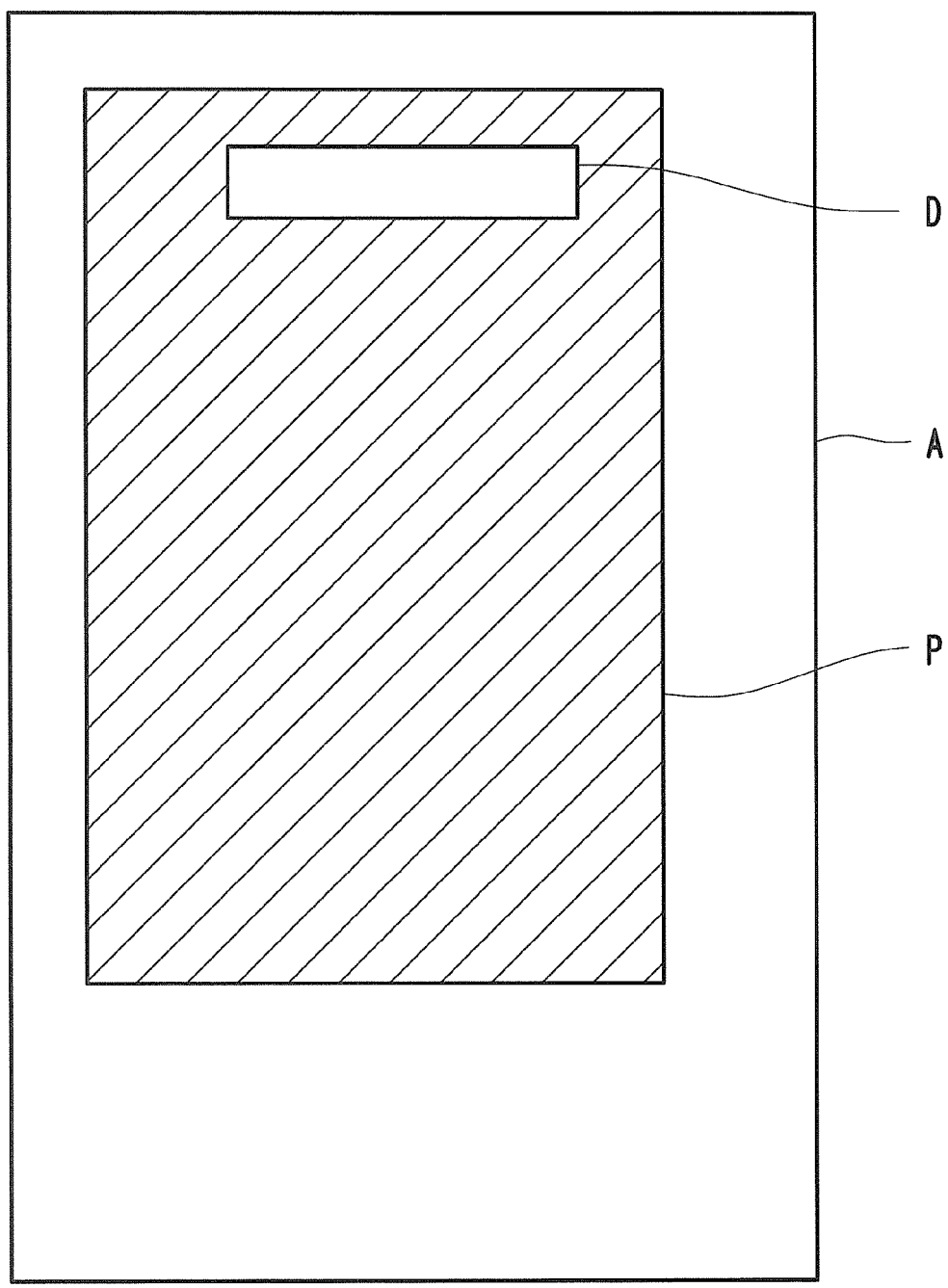
FIG. 2 is a diagram illustrating how a processing unit 105 executes a scan procedure and compares images according to an embodiment of the invention.

To be specific, when the processing unit 105 determines that the executed time of the detection procedure is shorter than a preset time (for example, 1 second; however, is not limited thereto and can be determined according to the actual requirement), the processing unit 105 further executes the scan procedure to obtain a comparison image and compares the comparison image with the previously captured image of the paper P temporarily stored in the storage unit 107, so as to obtain the similarity comparison result. Herein, FIG. 2 is a diagram illustrating how a processing unit 105 executes a scan procedure and compares images according to an embodiment of the invention. In FIG. 2, the symbol A indicates a scanning window of the scan module 101, and the symbol D indicates a comparison window.

In the present embodiment, when the processing unit 105 executes the scan procedure, the processing unit 105 controls the scan module 101 to capture image only within the comparison window D (i.e., no need to capture image of the entire paper P; however, not limited thereto) to obtain the comparison image. Herein the comparison image is corresponding to at least a portion of the previously captured image of the paper P. Moreover, when the processing unit 105 controls the scan module 101 to capture image only within the comparison window D, the processing unit 105 may control the scan module 101 to capture the image by using a scanning resolution and/or a color resolution equal to or slightly lower than those for scanning the paper P. Moreover, the comparison window D should be defined/selected as small and as close to the scan module 101 as possible, so that an image capturing unit in the scan module 101 can be moved the least. However, such variation in the implementation of the invention should be determined according to the actual design or application requirement.

After obtaining the comparison image, the processing unit 105 compares the comparison image with the previously captured image of the paper P temporarily stored in the storage unit 107. To be specific, if the processing unit 105 determines that the similarity between the comparison image and the previously captured image of the paper P (i.e., an image corresponding to the same portion of the comparison window D) is lower than a predetermined value (for example, 90%, not limited thereto), the processing unit 105 determines the similarity comparison result to be a low similarity. Namely, the user may have taken the paper P away or have placed another paper into the MFP 10 within the preset time (i.e., 1 second). Accordingly, the processing unit 105 controls the alarm unit 109 to turn off the alarm (for example, one or a combination of an indicating text, a sound, and a lamplight).

On the other hand, if the processing unit 105 determines that the similarity between the comparison image and the previously captured image of the paper P (i.e., an image corresponding to the same portion of the comparison window D) is higher than the predetermined value (i.e., higher than 90%), the processing unit 105 determines the similarity comparison result to be a high similarity. Namely, the user may remind the paper P in the MFP 10. Accordingly, the processing unit 105 continuously determines whether the executed time of the detection procedure is still shorter than the preset time (i.e., 1 second).

Once the processing unit 105 determines that the executed time of the detection procedure is not shorter than the preset time (i.e., the executed time of the detection procedure has exceeded 1 second), the processing unit 105 controls the alarm unit 109 to activate the alarm composed of one or more of the indicating text, the sound, and the lamplight until the processing unit 105 determines the similarity comparison result to be a low similarity.

In the present embodiment, when the processing unit 105 controls the alarm unit 109 to activate the alarm, for example, one or a combination of the indicating text, the sound, and the lamplight, the alarm intensity related to at least one of the sound and the lamplight may be gradually increased as the executed time of the detection procedure becomes longer, but the present invention is not limited hereto, and a presenting manner of the alarm, for example, one or a combination of the indicating text, the sound, and the lamplight, may also be changed according to actual application demands.

To be specific, in other embodiments of the present invention, the MFP 10 may further include an identification module 111 and a network module 113. The identification module 111 is coupled to and controlled by the processing unit 105, for identifying an identity of the user. In addition, the network module 113 is coupled to and controlled by the processing unit 105, for sending the alarm, for example, the indicating text, to a computer device 20 corresponding to the user in an E-main manner through, for example, a wired or wireless network connection, when the processing unit 105 controls the alarm unit 109 to activate the alarm, for example, one or a combination of the indicating text, the sound, and the lamplight. Moreover, the content of the sent E-mail may include a network name and a placed location of the MFP 10, and the time of accomplishing the image capturing of the paper P by the MFP 10, but the present invention is not limited hereto.

Accordingly, the user hears and/or sees the alarm, for example, one or a combination of the indicating text, the sound, and the lamplight at once, and learns/knows that the paper P is remained in the MFP 10, so that the user opens the TC of the MFP 10 to take away the paper P. Once the user takes away the paper P, the processing unit 105 determines the similarity comparison result to be a low similarity and controls the alarm unit 109 to turn off the alarm composed of one or more of the indicating text, the sound, and the lamplight. Thereby, in the present embodiment, the paper P can be effectively prevented from being remained in the MFP 10.

Figure 3:
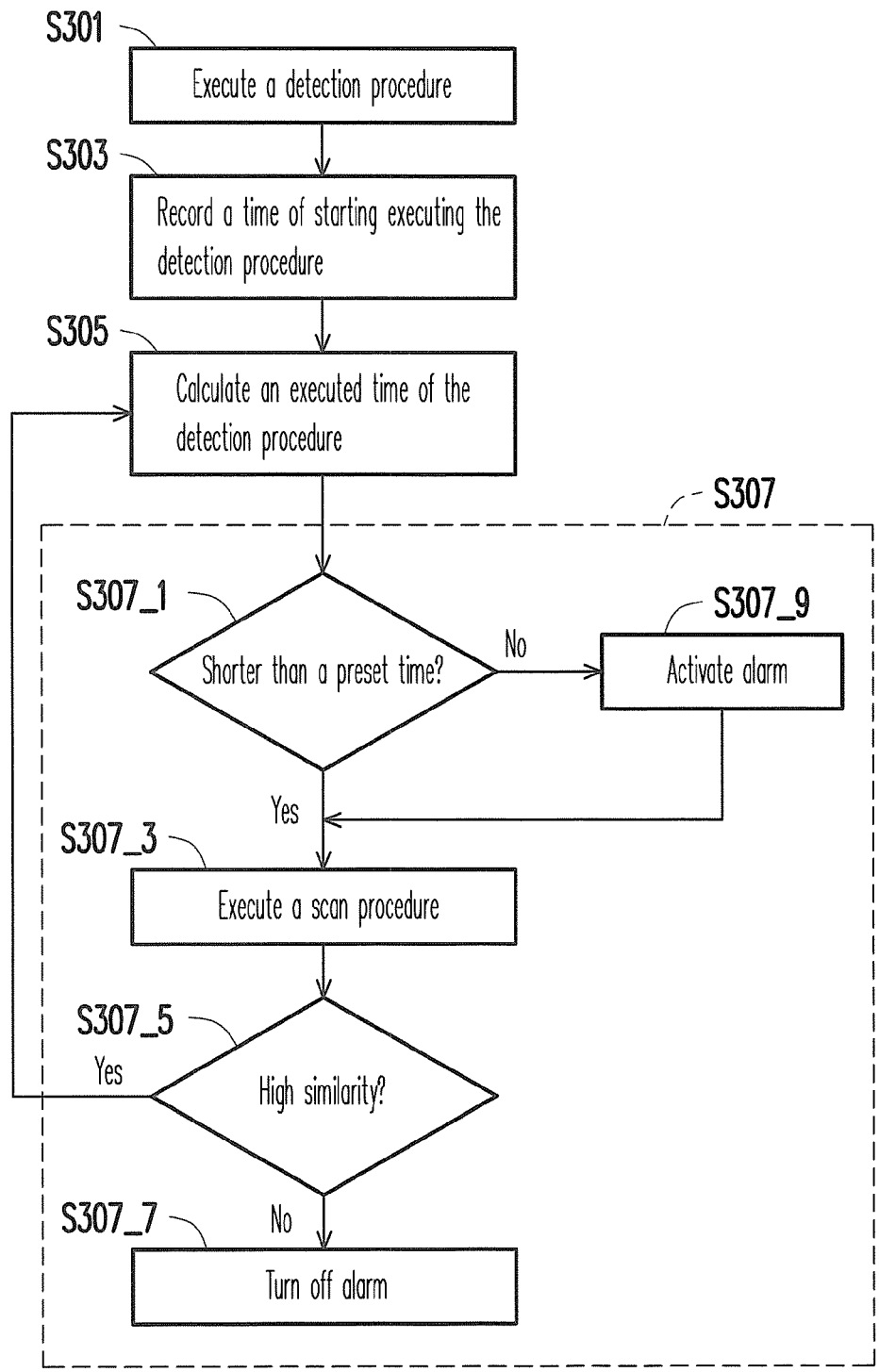
FIG. 3 is a flowchart of a method for detecting whether a paper is remained in an MFP according to an embodiment of the invention.

FIG. 3 is a flowchart of a method for detecting whether a paper is remained in an MFP according to an embodiment of the invention. Referring to FIG. 3, the method in the present embodiment for detecting whether a paper is remained includes following steps.

A detection procedure is executed when the MFP accomplishes image capturing and outputting of the paper (step S301).

A time of starting executing the detection procedure is recorded (step S303).

The executed time of the detection procedure is calculated (step S305).

Whether to activate an alarm composed of one or more of an indicating text, a sound, and a lamplight is determined according to the executed time of the detection procedure and a similarity comparison result obtained by executing a scan procedure (step S307), so as to remind a user whether the paper is remained in the MFP.

The step S307 in the present embodiment further includes following steps.

Whether the executed time of the detection procedure is shorter than a preset time is determined (step S307_1).

When it is determined in step S307_1 that the executed time of the detection procedure is shorter than the preset time, the scan procedure is further executed (step S307_3) to obtain a comparison image which is corresponding to at least a portion of an previously captured image of the paper, and the comparison image is compared with a previously captured image of the paper (step S307_5) so as to obtain the similarity comparison result.

If the similarity between the comparison image and the previously captured image of the paper is lower than a predetermined value (for example, 90%, but not limited thereto), the similarity comparison result is determined to be a low similarity (which indicates that the user has taken the paper away or has placed another paper into the MFP within the preset time), and the alarm composed of one or more of the indicating text, the sound, and the lamplight is accordingly turned off (step S307_7).

If the similarity between the comparison image and the previously captured image of the paper is higher than the predetermined value (i.e., above 90%), the similarity comparison result is determined to be a high similarity (which indicates that the user may remain the paper in the MFP), so that steps S305 and S307_1 are executed again to determine whether the executed time of the detection procedure is shorter than the preset time.

If it is determined in step S307_1 that the executed time of the detection procedure is not shorter than the preset time (i.e., the executed time of the detection procedure is longer than the preset time), the alarm composed of one or more of the indicating text, the sound, and the lamplight is activated (step S307_9) until the similarity comparison result is determined to be a low similarity (i.e., the user has taken the paper away or has placed another paper into the MFP).

In the present embodiment, when the alarm composed of one or more of the indicating text, the sound, and the lamplight is activated in step S307_9, the alarm intensity related to at least one of the sound and the lamplight may be gradually increased as the executed time of the detection procedure becomes longer, but the present invention is not limited hereto, and a presenting manner of the alarm, for example, one or a combination of the indicating text, the sound, and the lamplight, may also be changed according to the actual application demands.

To be specific, an identity recognition may exist between the MFP and the user, and a wired or wireless network connection may exist between the MFP and a computer device corresponding to the user. Thus, when the alarm, for example, one or a combination of the indicating text, the sound, and the lamplight, is activated in Step S307_9, the indicating text may be sent to the computer device corresponding to the user in an E-main manner through the wired or wireless network connection. In this manner, the user hears and/or sees the alarm, for example, one or a combination of the indicating text, the sound, and the lamplight, at once, and learns/knows that the paper is remained in the MFP, so that the user opens the TC of the MFP to take away the paper, thereby avoiding the problem that the paper is remained in the MFP.

In summary, in the present invention, when accomplishing the image capturing and the outputting of the paper, the MFP starts to detect whether the paper is remained in the MFP. Once detecting that the paper is remained in the MFP for a time exceeding the preset time, the MFP activates the alarm, for example, one or a combination of the indicating text, the sound, and the lamplight, so as to remind the user. In this manner, the problem that the paper is remained in the MFP is effectively solved. Although the MFP is taken as an example for description in the above embodiments, according to the spirit of the present invention, the method is also applicable to an independent and non-integrated scanning device or photocopying device, and the modified device subject matters still fall within the protection scope of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents. Any embodiment of the present invention or the scope of the claim is not required to achieve all the objectives or advantages or features provided by the present invention. In addition, the abstract and the title are for the use of searching the patent file, and are not intended to limit the present invention.

What is claimed is:

1. A method for detecting whether a paper is remained, adaptable to a multi-function printer (MFP), the method being performed by a processing unit of the MFP, and the method comprising:

executing a detection procedure, when the MFP accomplishes image capturing and outputting of the paper;

recording a time of starting executing detection procedure;

calculating an executed time of the detection procedure; and determining whether to activate an alarm according to the executed time of the detection procedure and an image similarity comparison result obtained by executing a scan procedure, so as to remind a user whether the paper is remained in the MFP, wherein the step of determining whether to activate the alarm according to the executed time of the detection procedure and the image similarity comparison result obtained by executing the scan procedure comprises:

determining whether the executed time of the detection procedure is shorter than a preset time;

further executing the scan procedure to obtain a comparison image when determining that the executed time of the detection procedure is shorter than the preset time, wherein the comparison image is corresponding to at least a portion of an previously captured image of the paper; and comparing the comparison image with the previously captured image of the paper to obtain the image similarity comparison result.

2. The method according to claim 1, wherein the step of determining whether to activate the alarm according to the executed time of the detection procedure and the image similarity comparison result obtained by executing the scan procedure further comprises:

when a similarity between the comparison image and the previously captured image of the paper is lower than a predetermined value, determining the image similarity comparison result to be a low similarity and accordingly turning off the alarm; and when a similarity between the comparison image and the previously captured image of the paper is higher than the predetermined value, determining the image similarity comparison result to be a high similarity and continuously determining whether the executed time of the detection procedure is shorter than the preset time.

3. The method according to claim 2, wherein the step of determining whether to activate the alarm according to the executed time of the detection procedure and the image similarity comparison result obtained by executing the scan procedure further comprises:

when the executed time of the detection procedure is not shorter than the preset time, activating the alarm until the image similarity comparison result is determined to be the low similarity.

4. The method according to claim 3, wherein the alarm comprises one or a combination of an indicating text, a sound, and a lamplight.

5. The method according to claim 4, wherein when the alarm is activated, an intensity of at least one of the sound and the lamplight is gradually increased as the executed time of the detection procedure becomes longer.

6. The method according to claim 4, wherein an identity recognition exists between the MFP and the user, a network connection exists between the MFP and a computer device corresponding to the user, and when the alarm is activated, the indicating text is sent to the computer device in an E-mail manner through the network connection.

7. A multi-function printer (MFP), comprising:
a scan module, for scanning a paper; and
a control module, coupled to the scan module, for controlling operation of the scan module, and detecting whether the paper is remained in the MFP according to an executed time of a detection procedure and an image similarity comparison result obtained by executing a scan procedure, when the MFP accomplishes image capturing and outputting of the paper, so as to determine whether to activate an alarm to remind a user,
wherein the control module comprises:
a processing unit, coupled to the scan module, for controlling the operation of the scan module, and for executing the detection procedure and the scan procedure when the MFP accomplishes the image capturing and the outputting of the paper;
a storage unit, coupled to the processing unit, for temporarily storing a previously captured image of the paper; and
an alarm unit, coupled to the processing unit, and controlled by the processing unit to determine whether to activate the alarm,
wherein when the processing unit executes the detection procedure, the processing unit records a time of starting executing the detection procedure, calculates the executed time of the detection procedure, and determines whether to control the alarm unit to activate the alarm according to the executed time of the detection procedure and the image similarity comparison result obtained by executing the scan procedure,
wherein when the processing unit determines the executed time of the detection procedure to be shorter than a preset time, the processing unit further executes the scan procedure to obtain a comparison image and compares the comparison image with the previously captured image of the paper to obtain the image similarity comparison result, wherein the comparison image is corresponding to at least a portion of the previously captured image of the paper.

8. The MFP according to claim 7, wherein:
when a similarity between the comparison image and the previously captured image of the paper obtained by the processing unit is lower than a predetermined value, the processing unit determines the image similarity comparison result to be a low similarity and accordingly controls the alarm unit to turn off the alarm; and
when a similarity between the comparison image and the previously captured age of the paper obtained by the processing unit is higher than the predetermined value, the processing unit determines the image similarity comparison result to be a high similarity and continuously determines whether the executed time of the detection procedure is shorter than the preset time.

9. The MFP according to claim 8, wherein when the processing unit determines the executed time of the detection procedure to be not shorter than the preset time, the processing unit controls the alarm unit to activate the alarm until the image similarity comparison result is determined to be the low similarity.

10. The MFP according to claim 9, wherein the alarm comprises one or a combination of an indicating text, a sound, and a lamplight.

11. The MFP according to claim 10, wherein when the processing unit controls the alarm unit to activate the alarm, an intensity of at least one of the sound and the lamplight is gradually increased as the executed time of the detection procedure becomes longer.

12. The MFP according to claim 10, further comprising:
an identification module, coupled to and controlled by the processing unit, for identifying an identity of the user; and
a network module, coupled to and controlled by the processing unit, for sending the indicating text to a computer device corresponding to the user in an E-mail manner through a network connection when the processing unit controls the alarm unit to activate the alarm.

* * * * *